United States Patent
Liu

(10) Patent No.: US 10,404,936 B2
(45) Date of Patent: Sep. 3, 2019

(54) METHOD AND APPARATUS FOR PROCESSING VIDEO SIGNAL

(71) Applicant: AutoChips Inc., Hefei, Anhui Province (CN)

(72) Inventor: Chao Liu, Hefei (CN)

(73) Assignee: AUTOCHIPS INC., Hefei, Anhui Province (CN)

(*) Notice: Subject to any disclaimer, the term of this patent is extended or adjusted under 35 U.S.C. 154(b) by 11 days.

(21) Appl. No.: 15/721,878

(22) Filed: Sep. 30, 2017

(65) Prior Publication Data

US 2018/0098024 A1   Apr. 5, 2018

(30) Foreign Application Priority Data

Sep. 30, 2016   (CN) .......................... 2016 1 0875108

(51) Int. Cl.
  *H04N 7/01* (2006.01)
  *G06T 1/00* (2006.01)
  *H04N 9/79* (2006.01)

(52) U.S. Cl.
  CPC ........... *H04N 7/012* (2013.01); *G06T 1/0007* (2013.01); *H04N 9/7921* (2013.01); *G06T 2200/32* (2013.01)

(58) Field of Classification Search
  CPC ..... H04N 7/012; H04N 9/7921; G06T 1/0007
  USPC .......................... 348/448, 441, 443, 459, 911
  See application file for complete search history.

(56) References Cited

U.S. PATENT DOCUMENTS

| | | | |
|---|---|---|---|
| 2002/0163595 A1 | 11/2002 | Adams | |
| 2007/0035659 A1* | 2/2007 | Choi | H04N 7/012 348/441 |
| 2007/0236604 A1 | 10/2007 | Moesle | |
| 2010/0124276 A1 | 5/2010 | Zhou | |
| 2011/0211074 A1 | 9/2011 | Doswald | |

FOREIGN PATENT DOCUMENTS

| | | |
|---|---|---|
| CN | 101090471 A | 12/2007 |
| CN | 201444676 U | 4/2010 |

* cited by examiner

Primary Examiner — Jefferey F Harold
Assistant Examiner — Jean W Desir
(74) Attorney, Agent, or Firm — Cheng-Ju Chiang

(57) ABSTRACT

A method and an apparatus for processing a video signal are provided. The method for processing a video signal includes: performing image processing of the video signal which contains no odd-even field information, and acquiring processed field image data; identifying and acquiring corresponding odd-even field information based on first field image data and second field image data continuous in time among the processed field image data; and performing deinterlace processing of the processed field image data based on the corresponding odd-even field information, thereby acquiring frame image data. In this way, the odd-even field information is identified from the image data in real time; the displaying effect of the video image will not be affected even though the fields are discarded, and the cost is low.

18 Claims, 6 Drawing Sheets

METHOD AND APPARATUS FOR
PROCESSING VIDEO SIGNAL

CROSS-REFERENCE TO RELATED
APPLICATIONS

This application claims all benefits accruing under 35 U.S.C. § 119 from China Patent Application No. 201610875108.4, field on Sep. 30, 2016 in the China Intellectual Property Office, the contents of which are hereby incorporated by reference.

TECHNICAL FIELD

The present disclosure generally relates to image processing technologies, and in particular relate to a method and an apparatus for processing a video signal.

BACKGROUND

An apparatus using Composite Video Blanking and Sync (CVBS) signals, such as a Digital Video Disk (DVD), a low-performance camera device, and the like, is still widely used due to the low cost thereof. At present, a piece of video formed by interlaced scanning CVBS signals needs to be processed by deinterlace algorithm before it is outputted to a progressively scanning display device. When using the deinterlace algorithm, important information that whether field is an odd field formed by odd-numbered rows or an even field formed by even-numbered rows needs to be provided.

However, some of advanced image processing chips can only process high-definition and progressively scanning videos, and cannot provide the functions of interlaced scanning videos processing, odd-even field identification, and deinterlace processing. In fact, odd-even field information in the CVBS signals will be discarded by the advanced image processing chips of this type. In order to further reduce cost, a CVBS source video signal may be used, and the advanced image processing chips aforesaid may be used subsequently.

However, as is mentioned above, the advanced image processing chips aforesaid cannot provide a function of odd-even field identification, and will discard the odd-even field information in the CVBS signals. Furthermore, data acquired by the advanced image processing chips is in field, rather than in frame. That is, the image data each time acquired includes the field containing all the odd-numbered rows or the field containing all the even-numbered rows; however, the odd-even feature of the data of each field cannot be identified by the advanced image processing chips. Meanwhile, for the sake of reducing cost, as is mentioned above, the advanced image processing chips used can provide neither the function of deinterlace processing, nor the function of odd/even field identification; in this way, after acquiring the image date from the advanced image processing chips, software is needed to perform the deinterlace processing, and thus the odd-even field information should be identified from the image data.

When the odd-even field information provided in the CVBS signals is identified, deinterlaced and synthesized into an integrated frame of image by specialized hardware, the cost of the specialized hardware is fairly high as a result. Furthermore, it is possible for the field to be discarded by the image processing chips, and thus the time correlation of the odd-even field may be disordered, and errors may occur in the field sequence. In lots of solutions, the field sequence is preset at the beginning of video playing; however, when the deinterlace processing is performed in this mode all the time, visibly jaggies will be produced in the processed images, and the self-adaptive adjustment cannot be achieved, resulting in a poor processing effect. In this case, the setting of the odd-even field used before will be failed, and thus it needs to detect in real time whether this specific case happens, and correct the errors in time.

In addition, the solutions using an input in field generally adopt the intensive analysis, and can acquire the results only after the processes of the whole video are finished. Therefore, when using these solutions, a large calculation amount is involved, thereby prolonging the processing time, which cannot meet the requirement of real-time identification.

SUMMARY

Embodiments of the present disclosure provide a method and an apparatus for processing a video signal, by which the odd-even field information from the image data can be identified in real time, the displaying effect of the video image will not be affected even though the fields are discarded, and the cost is low.

In accordance with an aspect of the present application, a method for processing a video signal is provided, and the method comprising: performing image processing of the video signal which contains no odd-even field information, and acquiring processed field image data; identifying and acquiring corresponding odd-even field information based on first field image data and second field image data continuous in time among the processed field image data; and performing deinterlace processing of the processed field image data based on the corresponding odd-even field information, thereby acquiring frame image data.

In accordance with an aspect of the present disclosure, an apparatus for processing a video signal is further provided, which comprises: an image processing chip, configured for performing image processing of the video signal containing no field information, and acquiring processed field image data; an odd-even field information identification module, connected to the image processing chip and configured for identifying and acquiring corresponding odd-even field information based on first field image data and second field image data which are continuous in time among the processed field image data; and a deinterlace processing module, connected to the odd-even field information identification module and the image processing chip and configured for performing deinterlace processing of the processed field image data based on the corresponding odd-even field information in order to acquire frame image data.

According to the method and apparatus of processing a video signal, the subsequent advantages may be achieved: the image processing of the video signal containing no odd-even field information is performed, and thus the processed field image data is acquired; the odd-even field information is identified and acquired based on the first filed image data and the second filed image data which are continuous with each other in time in the processed field image data; and the deinterlace processing of the processed field image data is performed based on the corresponding odd-even field information, in order to acquire the frame image data. Therefore, the odd-even field information can be identified from the image data in real time, the display effect of video image will not be affected even though some fields are discarded, and the apparatus of the present disclosure costs low.

BRIEF DESCRIPTION OF THE DRAWINGS

In order to make the technical solution described in the embodiments of the present disclosure more clearly, the drawings used for the description of the embodiments will be briefly described. Apparently, the drawings described below are only for illustration but not for limitation. It should be understood that, one skilled in the art may acquire other drawings based on these drawings, without making any inventive work. In the drawings.

DETAILED DESCRIPTION

The technical solution of the embodiments of the present disclosure will be described more clearly and completely with reference to the accompanying drawings. Apparently, the embodiments described here only some exemplary embodiments, not all the embodiments. Based on the embodiments described in the present disclosure, one skilled in the art may acquire all other embodiments without any creative work. All these shall be covered within the protection scope of the present disclosure.

Figure 1:
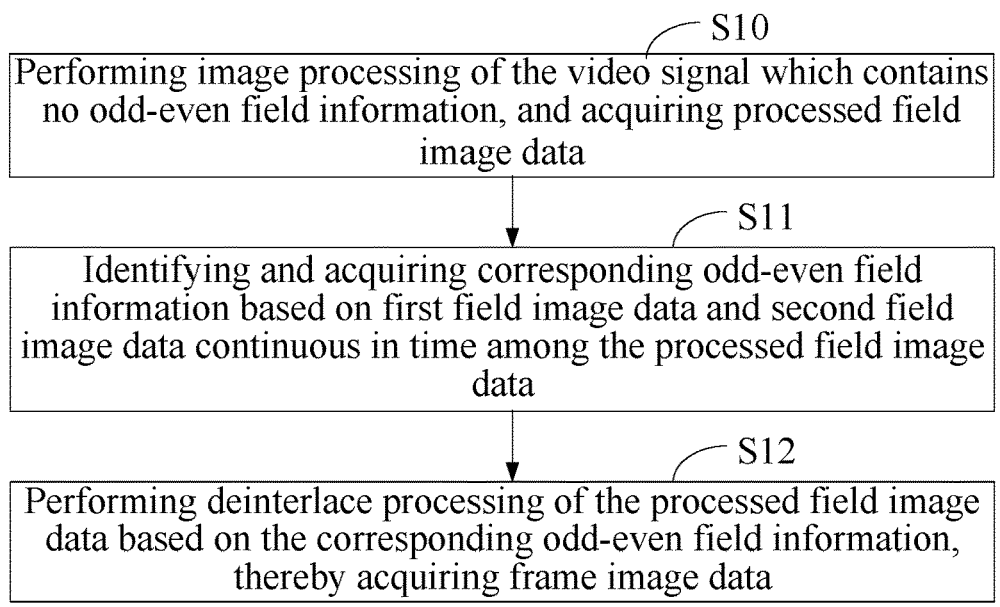
FIG. 1 is a flowchart illustrating a first embodiment of a method for processing a video signal according to the present disclosure.

FIG. 1 is a flowchart illustrating a first embodiment of a method for processing a video signal according to the present disclosure. As is shown in FIG. 1, the method for processing a video signal may comprise the following blocks.

In block S10, image processing of the video signal containing no odd-even field information may be performed, and thus processed field image data may be acquired.

In one embodiment of the block S10, the odd-even field information in the video signal may be discarded during the image processing; in this way, the processed field image data will not contain any odd-even field information.

In block S11, corresponding odd-even field information may be identified and acquired based on first field image data and second field image data continuous with the first field image data in time among the processed field image data.

In order to display the processed field image data normally, the deinterlace processing of the field image data needs to be performed to form frame image data configured for normally displaying video. However, the odd-even field information corresponding to the field image data needs to be acquired when performing the deinterlace processing.

Figure 2:
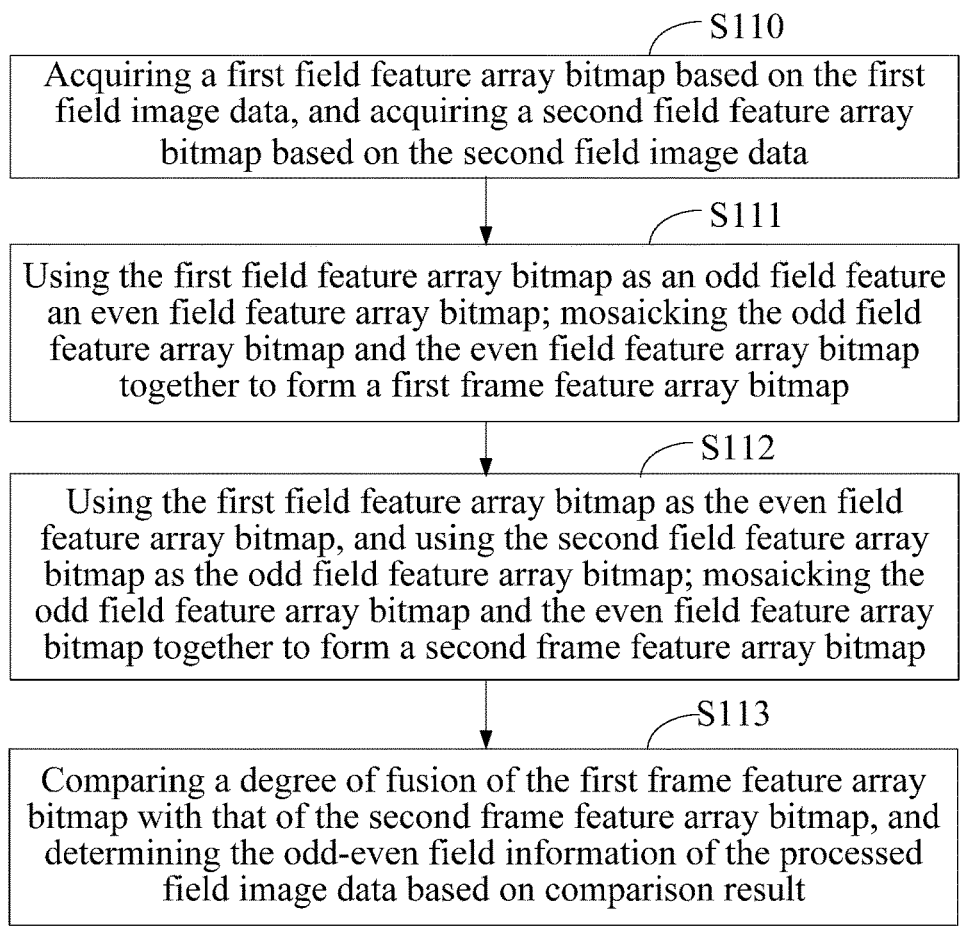
FIG. 2 is a flowchart illustrating the block S11 shown in FIG. 1.

Referring to FIG. 2, a flowchart illustrating one particular embodiment of the block S11 shown in FIG. 1 according to the present disclosure is depicted. As is shown in FIG. 2, the block S11 may further include the following blocks.

In block S110, a first field feature array bitmap may be acquired based on the first field image data, while a second field feature array bitmap may be acquired based on the second field image data.

In this case, it is possible for the second field image data to be a previous field image data provided continuously ahead of the first image data. However, it is only an illustration of the second field image data, not a limitation thereto. For example, in other cases, it is also possible for the second field image data to be a subsequent field image data provided continuously behind the first image data.

Figure 3A:
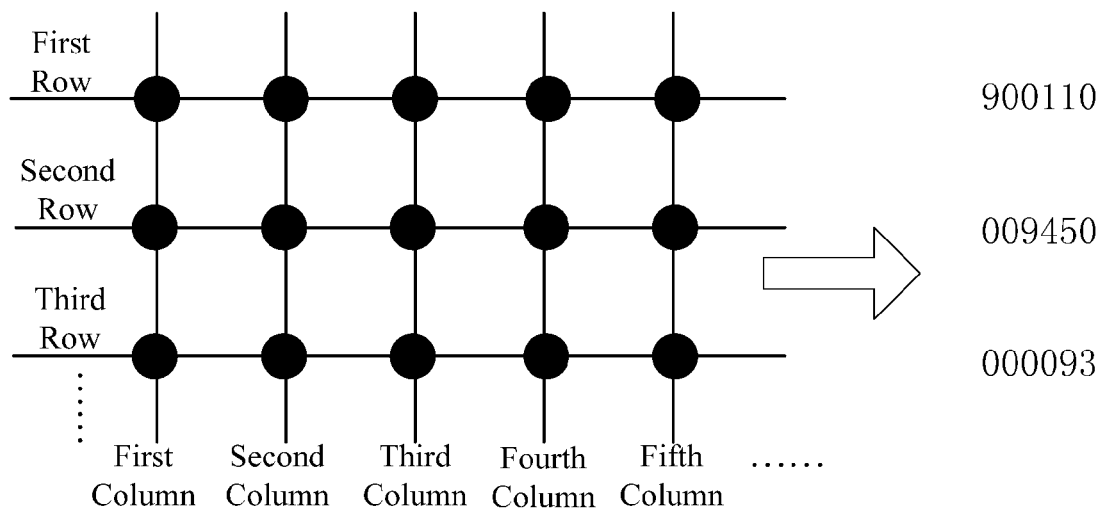
FIG. 3A is a schematic view illustrating an embodiment of the first difference value array formed by the first field image data according to the present disclosure.
Figure 3B:
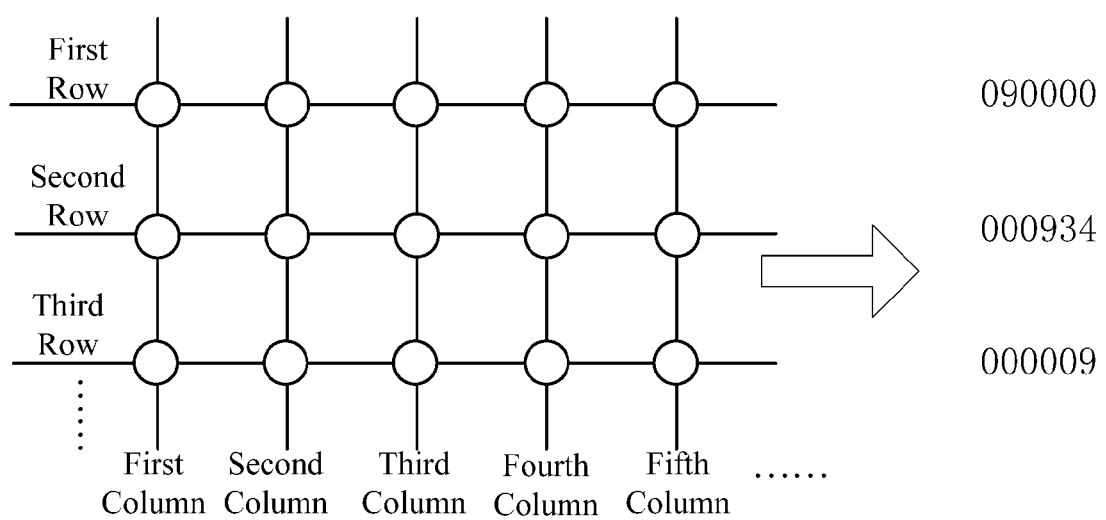
FIG. 3B is a schematic view illustrating an embodiment of the second difference value array formed by the second field image data according to the present disclosure.

In one embodiment of the block S110, difference values of pixels of every two adjacent columns respectively of the first field image data and the second field image data may be calculated, thereby a first difference value array and a second difference value array correspondingly may be formed. FIG. 3A is a schematic view illustrating the first difference value array formed by the first field image data, while FIG. 3B is a schematic view illustrating the second difference value array formed by the second field image data. As is shown in FIGS. 3A and 3B, taking a field image data in form of a 3×7 array as an example, when the field image data shown in FIG. 3A is [9000100, 0009500, 0000096], the difference values of the pixels of every two adjacent columns on the first row may be calculated, and further changed into corresponding absolute values, thereby the first row of the first difference value array may be acquired; the first row of the first difference value array in this case is 900110. Correspondingly, the second row and the third row of the first difference value array are respectively 009450, 000093. When the field image data shown in FIG. 3B is [9900000, 0000962, 0000009], likewise, the difference values of the pixels of every two adjacent columns may be respectively calculated, and further changed into corresponding absolute values, thereby the first, the second and the third rows of the second difference value array may be acquired. In this case, the first, the second and the third rows of the second first difference value array are respectively 090000, 000934 and 000009.

Figure 4:
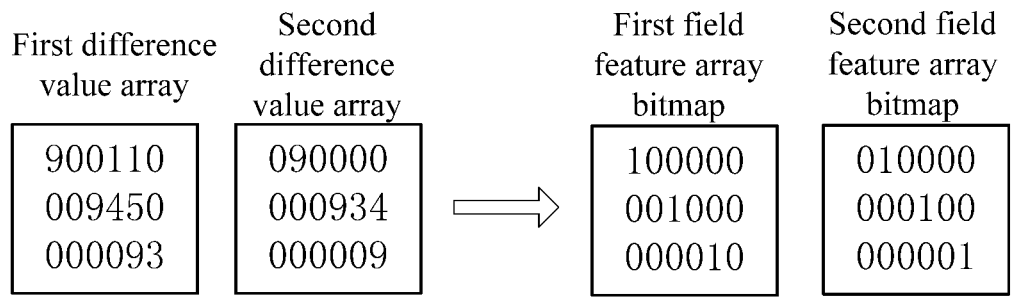
FIG. 4 is a schematic view illustrating the forming of the first field feature array bitmap and the second field feature array bitmap according to the present disclosure.

In one embodiment of the block S110, furthermore, each of the difference values in the first difference value array and the second difference value array may be compared with a preset threshold value. When the difference value at one point of the first difference value array or the second difference value array is greater than the preset threshold value, then a value of this point may be set to 1 for indicating that the point is a contour point, the feature may be significantly changed, and the point may be determined as a boundary point. When the difference value at one point of the first difference value array or the second difference value array is less than or equal to the preset threshold value, the value of the point may be set to 0. In this way, the first field feature array bitmap and the second field feature array bitmap may be formed. In this case, the value of the preset threshold value can be determined based on empirical values in actual debugging process, as long as contour lines in the image can be well distinguished. For example, when the threshold value is 5, the first field feature array bitmap and the second field feature array bitmap acquired from the first difference value array and the second difference value array may be as shown in FIG. 4. For those points having a difference value greater than the threshold value 5, such as the points having a value of 9 in FIG. 4, then the value of the points may be set to 1. However, for those points having a difference value smaller than or equal to the threshold value 5, such as the points having a value of 0/1/3/4/5, the value of the points may be set to 0.

In block S111, the first field feature array bitmap may be used as an odd field feature array bitmap, while the second field feature array bitmap may be used as an even field feature array bitmap; the odd field feature array bitmap and the even field feature array bitmap may be mosaicked together to form a first frame feature array bitmap.

Figure 5:
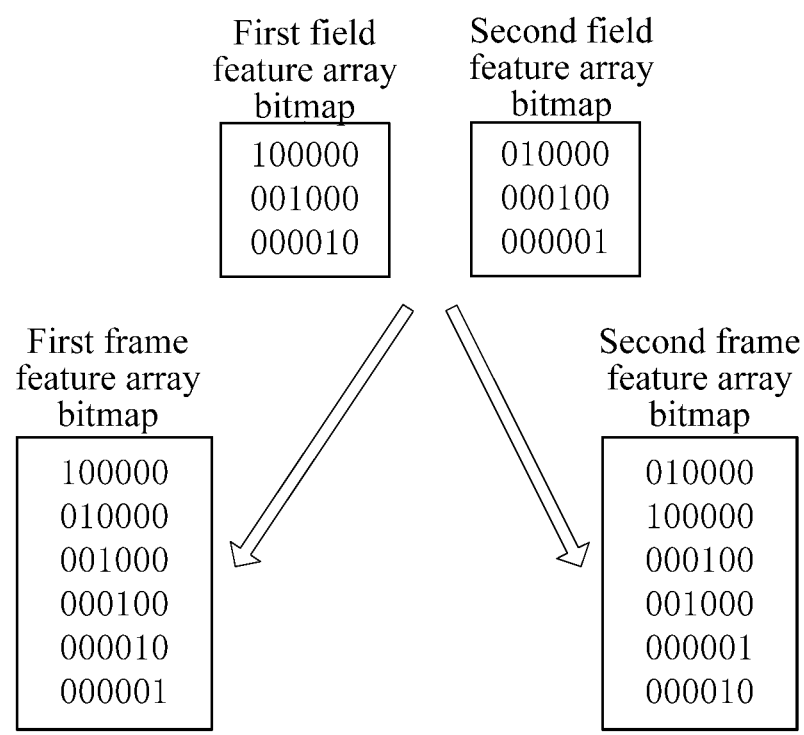
FIG. 5 is a schematic view illustrating the forming of the first frame feature array bitmap and the second frame feature array bitmap according to the present disclosure.

In specific, the first field feature array bitmap used as odd-numbered row feature array and the second field feature array bitmap used as even-numbered row feature array may be mosaicked together to form the first frame feature array bitmap. As is shown in FIG. 5, the first row, the second row and the third row in the first field feature array bitmap may be respectively used as the first row, the third row and the fifth row in the first frame feature array bitmap; while the first row, the second row and the third row in the second field feature array bitmap may be respectively used as the second row, the fourth row and the sixth row in the first frame feature array bitmap. The first frame feature array bitmap may be therefore formed by mosaicing the first field feature array bitmap and the second field feature array bitmap together by this means.

In block S112, the first field feature array bitmap may be used as the even field feature array bitmap, while the second field feature array bitmap may be used as the odd field feature array bitmap; the odd field feature array bitmap and even field feature array bitmap may be mosaicked together to form a second frame feature array bitmap.

In specific, the first field feature array bitmap used as even-numbered row feature array and the second field feature array bitmap used as odd-numbered row feature array may be mosaicked together to form the second frame feature array bitmap. As is shown in FIG. 5, the first row, the second row and the third row in the first field feature array bitmap may be respectively used as the second row, the fourth row and the sixth row in the second frame feature array bitmap; while the first row, the second row and the third row in the second field feature array bitmap may be respectively used as the first row, the third row and the fifth row in the second frame feature array bitmap. The first frame feature array bitmap may be therefore formed by mosaicing the first field feature array bitmap and the second field feature array bitmap together by this means.

In block S113, a degree of fusion of the first frame feature array bitmap may be compared with that of the second frame feature array bitmap, and the odd-even field information of the processed field image data may be determined based on comparison result.

In one embodiment of the block S113, quantities of the continuous contour points respectively in the first frame feature array bitmap and the second frame feature array bitmap may be acquired. In specific, firstly, one contour point respectively in the first frame feature array bitmap and in the second frame feature array bitmap may be detected. Then a value of a previous column or a subsequent column in a next row of the contour point may be determined whether it is 1; when the value is 1, the contour points are continuous; otherwise, the contour points are discontinuous. After that, the quantities of the continuous contour points respectively in the first frame feature array bitmap and the second frame feature array bitmap may be calculated. In this way, it is possible to compare the degree of fusion of the first frame feature array bitmap with that of the second frame feature array bitmap based on the quantities of the contour points respectively of the first frame feature array bitmap and the second frame feature array bitmap. In this case, the more continuous contour points, the greater degree of fusion.

As is shown in FIG. 5, the first point of the first row in the first frame feature array bitmap is a contour point, while the second point of the second row is also a contour point, then these two contour points are continuous. In this way, it can be calculated from FIG. 5 that the quantity of the continuous contour points in the first frame feature array bitmap is 5. While in the second frame feature array bitmap, the first point of the second row is a contour point, however, the second point of the third row is not a contour point; only the fourth point of the third row is not a contour point. In this case, the two contour points in the second row and the third row are discontinuous. In fact, in the second frame feature array bitmap, three groups of continuous contour points are provided therein, and each group may only include two continuous contour points. In specific, the three groups of the continuous contour points respectively may include: the two continuous contour points respectively of the first row and the second row, the two continuous contour points respectively of the third row and the fourth row, and the two continuous contour points respectively of the fifth row and the sixth row. Accordingly, the quantity of the continuous contour points in the second frame feature array bitmap is 3. Therefore, the degree of fusion of the first frame feature array bitmap is greater than that of the second frame feature array bitmap.

In one embodiment of the block S113, when the degree of fusion of the first frame feature array bitmap is greater than that of the second frame feature array bitmap, the first frame feature array bitmap is mosaicked in the right way. The first field image data corresponding to the first field feature array bitmap may be used as the odd field image data, while the second field image data corresponding to the second field feature array bitmap may be used as the even field image data. On the contrary, when the degree of fusion of the first frame feature array bitmap is lower than that of the second frame feature array bitmap, the second frame feature array bitmap is mosaicked in the right way. The first field image data corresponding to the first field feature array bitmap may be used as the even field image data, while the second field image data corresponding to the second field feature array bitmap may be used as the odd field image data. For example, the degree of fusion of the first frame feature array bitmap in FIG. 5 is greater than that of the second frame feature array bitmap, which means the first frame feature array bitmap is mosaicked in the right way; that is, the first field feature array bitmap is the odd field feature array bitmap, while the second field feature array bitmap is the even field feature array bitmap. Correspondingly, the first field image data forming the first difference value array is the odd field image data, while the second field image data forming the second difference value array is the even field image data.

In a further embodiment of the present disclosure, it is also possible to detect row and column positions of each of the contour points respectively in the first frame feature array bitmap and the second frame feature array bitmap, and correspondingly form a first array and a second array by the detected row and column positions. After that, position difference values between every two adjacent elements in the first array and the second array may be calculated, and the odd-even field information of the processed field image data may be in turn determined based on the variation of the position difference values. In specific, when a hopping is happened to the position difference values of the first array or the second array, the first frame feature array bitmap or the second frame feature array bitmap may be considered to be mosaicked in the wrong way. However, when the position difference values of the first array or the second array are changed linearly, such as the position differences increase or decrease successively, or keep constant, the first frame feature array bitmap or the second frame feature array bitmap may be considered to be mosaicked in the right way. For example, in an embodiment shown in FIG. 5, the first array formed by the first frame feature array bitmap is [(1,1) (2,2) (3,3) (4,4) (5,5) (6,6)], and the array of the corresponding position difference values is [(1,1) (1,1) (1,1) (1,1) (1,1) (1,1)]. While the second array formed by the second frame feature array bitmap is [(1,2) (2,1) (3,4) (4,3) (5,6) (6,5)], and the array of the corresponding position difference values is [(1,2) (1,−1) (1,3) (1,−1) (1,3) (1,−1).

When the first frame feature array bitmap is mosaicked in the right way, the first field image data may be used as the odd field image data, while the second field image data may be used as the even field image data. However, when the second frame feature array bitmap is mosaicked in the right way, the first field image data may be used as the even field image data, while the second field image data may be used as the odd field image data.

In block S12, deinterlace processing of the processed field image data may be performed based on the corresponding odd-even field information, thereby acquiring the frame image data.

In one embodiment of the block S12, when the processed field image data is the odd field image data, the deinterlace processing may be performed by using the processed field image data as the image data of the odd-numbered rows, meanwhile using continuous previous field image data or subsequent field image data as the image data of the even-numbered rows, in order to acquire the frame image data. When the processed field image data is the even field image data, the deinterlace processing may be performed by using the processed field image data as the image data of the even-numbered rows, meanwhile using the continuous previous field image data or subsequent field image data as the image data of the odd-numbered rows, in order to acquire the frame image data.

By using the methods described above, the odd-even field information can be identified from the image data in real time, and the identification of the odd-even field information will not be affected even though the fields are discarded. In this way, it is possible to perform the deinterlace processing based on reasonable and correct odd-even field information all the time, and the display effect of the video image will not be affected even though the fields are discarded.

In an embodiment of the present disclosure, considering that determination errors may be existed when performing the odd-even field information identification since a group of data in the video image may be substantially the same, and may not have any contour line or the contour lines thereof cannot be found; or all the contour lines of a group may be vertical or horizontal, making that few differences exist when the odd-numbered rows are exchanged with the even-numbered rows; or all the objects having contour features in the video image may be moving rapidly, in which all the contours are in shape of zigzags, it needs to adjust the field sequence in the deinterlace processing.

Figure 6:
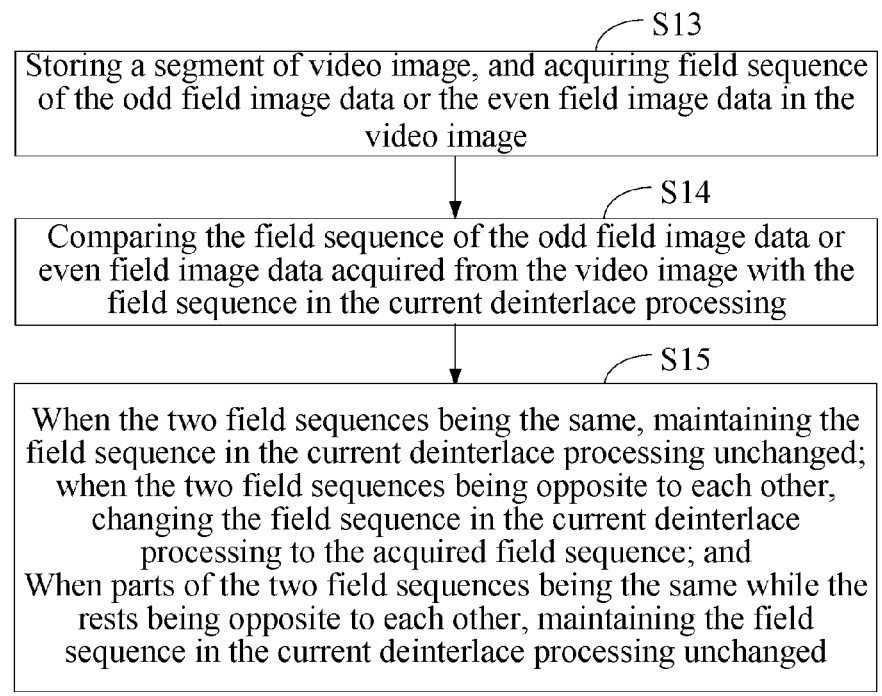
FIG. 6 is a flowchart illustrating a second embodiment of a method for processing a video signal according to the present disclosure.

In specific, FIG. 6 is a flowchart illustrating a second embodiment of a method for processing a video signal according to the disclosure. As is shown in FIG. 6, the method for processing a video signal may comprise the followings blocks.

In block S13, a segment of video image may be stored, and the field sequence of the odd field image data or the even field image data in the video image may be acquired.

Figure 7:
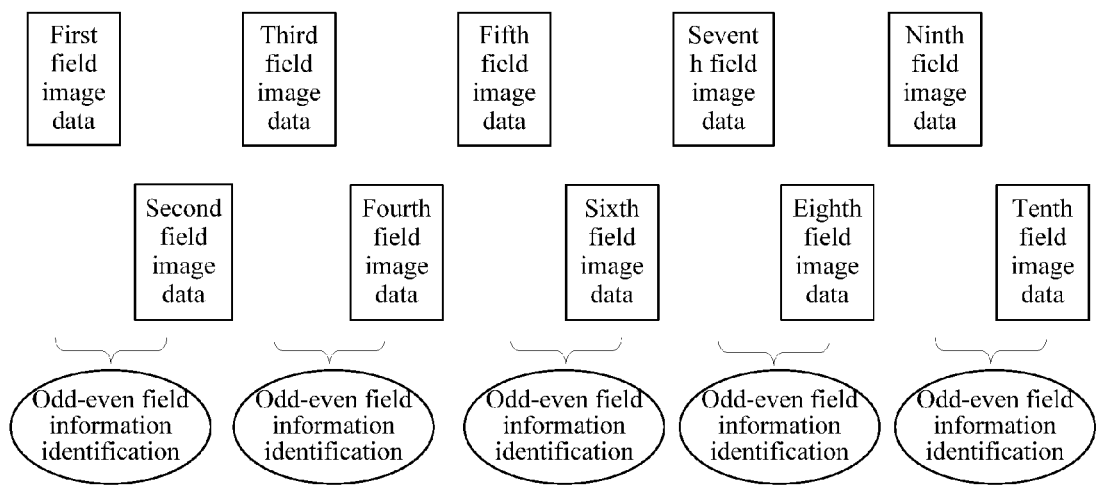
FIG. 7 is a schematic view illustrating the field sequence identification of the video image according to the present disclosure.

A plurality of continuous field image data may be divided into a plurality of groups by pairing two continuous field image data in time sequence. The odd field image data and the even field image data of each group may be identified, and the field sequence of the odd field image data or the even field image data may be acquired based on the identification result. As is shown in FIG. 7, taking storing ten fields of image data as an example, the ten fields of image data may be divided into five groups, and the odd field image data of each group may be identified, thereby the field sequence of the odd field image data can be acquired. In this case, when acquiring the odd-even field information of the ten fields of image data, the image data of the first, third, fifth, seventh and ninth field in the actual field sequence of the video image is the odd field image data.

In block S14, the field sequence of the odd field image data or even field image data acquired from the video image may be compared with the field sequence in the current deinterlace processing.

Figure 8:
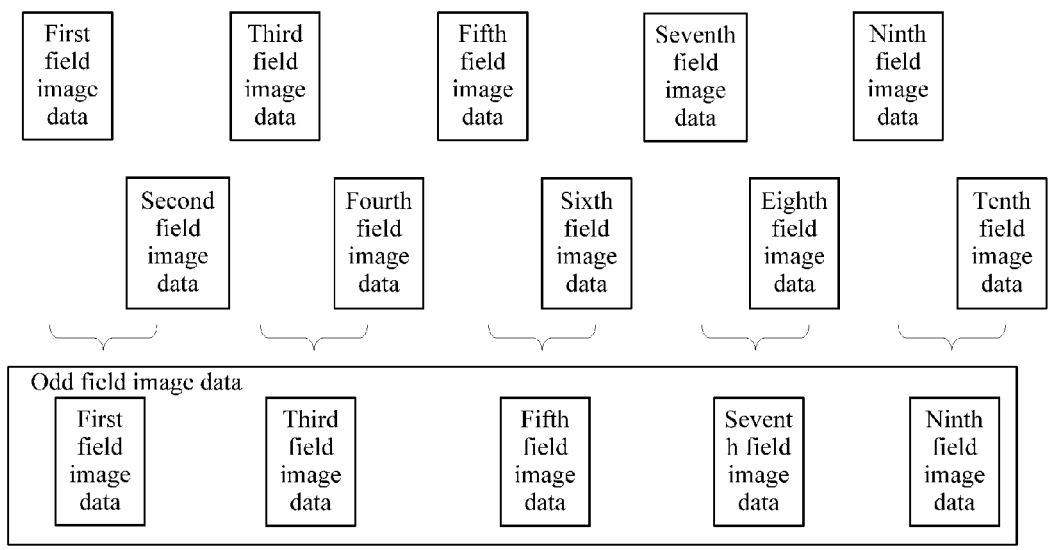
FIG. 8 is a schematic view illustrating the first field sequence of the video image according to the present disclosure.
Figure 9:
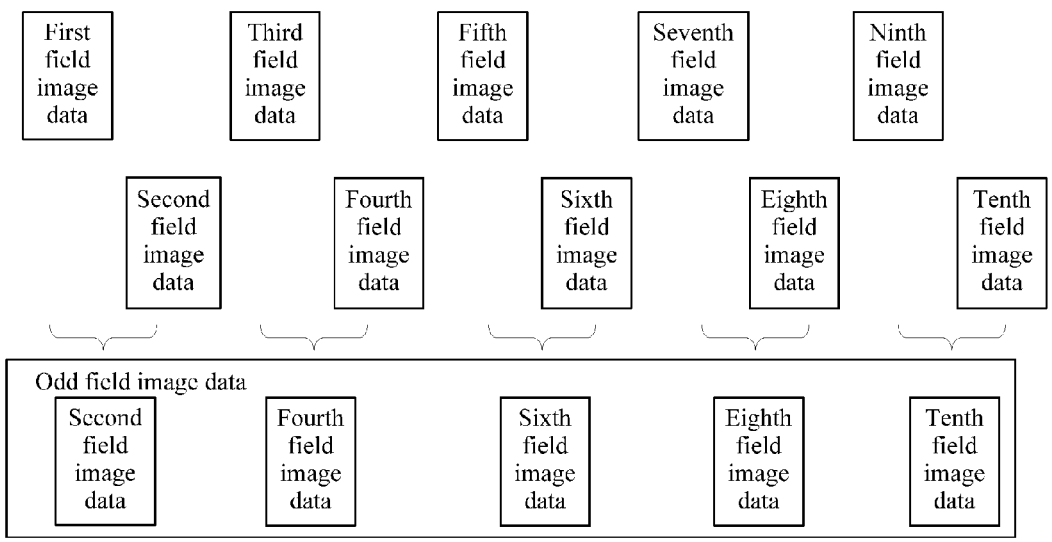
FIG. 9 is a schematic view illustrating the second field sequence of the video image according to the present disclosure.
Figure 10:
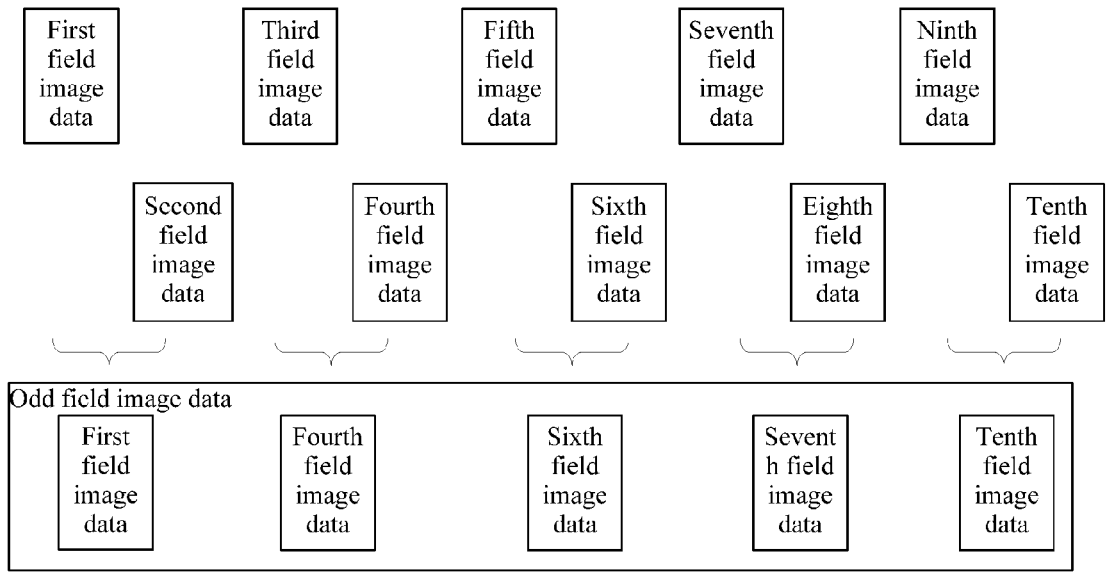
FIG. 10 is a schematic view illustrating the third field sequence of the video image according to the present disclosure.

In block S15, when the two field sequences are the same, the field sequence in the current deinterlace processing may maintain unchanged. When the two field sequences are opposite to the field sequence in the current deinterlace processing, the field sequence in the current deinterlace processing may be changed to the acquired field sequence. When parts of the two field sequences are the same while the rests are opposite to each other, the field sequence in the current deinterlace processing may maintain unchanged, that is, continuing processing in accordance with the previous effective field sequence identification result and entering the next round of identification process. FIGS. 8-10 show three field sequences acquired from the video image. Specifically in FIG. 8, the field sequence of the odd field image data acquired from the video image is the first, third, fifth, seventh and ninth field image data, which is the same as the field sequence in the current deinterlace processing, and the field sequence in the current deinterlace processing maintains unchanged. In FIG. 9, the field sequence of the odd field image data acquired from the video image is the second, fourth, sixth, eighth and tenth field image data, which is the opposite to the field sequence in the current deinterlace processing, and the field sequence in the current deinterlace processing is changed to the acquired field sequence. In FIG. 10, the field sequence of the odd field image data acquired from the video image is the first, fourth, sixth, seventh and tenth field image data, which means the acquired order and the field sequence in the current deinterlace processing are partially identical, while the rest are different; the contour features of the segment of the video image are regarded as unobvious, and the field sequence in the current deinterlace processing maintains unchanged; that is, continuing the processing in accordance with the previous effective field sequence identification result and entering next round of identification process.

Figure 11:
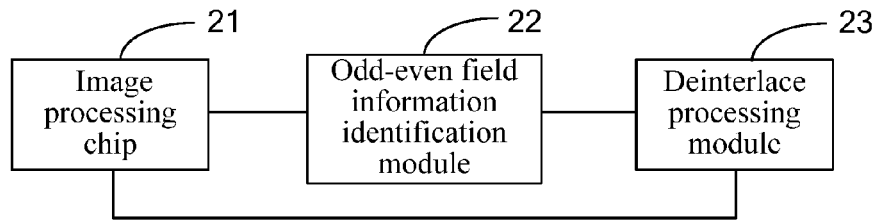
FIG. 11 is a block diagram illustrating a first embodiment of an apparatus for processing a video signal according to the present disclosure.

FIG. 11 is a schematic view illustrating a first embodiment of an apparatus for processing a video signal according to the present disclosure. As is shown in FIG. 11, the apparatus 20 may include an image processing chip 21, an odd-even field information identification module 22 and a deinterlace processing module 23. The image processing chip 21 may be configured for performing the image processing of the video signal containing no field information, and acquiring the processed field image data. The odd-even field information identification module 22 may be connected to the image processing chip 21, and configured for receiving the processed field image data outputted from the image processing chip 21 and identifying and acquiring the corresponding odd-even field information based on the first field image data and the second field image data which are continuous in time among the processed field image data. The deinterlace processing module 23 may be respectively connected to the odd-even field information identification module 22 and the image processing chip 21, and configured for performing the deinterlace processing of the processed field image data based on the corresponding odd-even field information, in order to acquire the frame image data.

In an embodiment of the present disclosure, the odd-even field information may be discarded when the image processing chip 21 is receiving video signal. Thus the image processing chip 21 will not provide any odd-even field information after performing the image processing of the field image data of the video signal. That is, the processed field image data will not contain any odd-even field information. When it is required to normally display the processed field image data, deinterlace processing of the processed field image data needs to be performed in order to form the frame image data configured for normally displaying the video. However, when performing a deinterlace processing, the odd-even field information corresponding to the field image data needs to be acquired.

Figure 12:
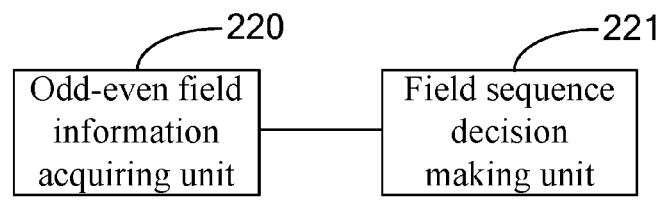
FIG. 12 is a block diagram illustrating a second embodiment of an apparatus for processing a video signal according to the present disclosure.

In an embodiment of the present disclosure, as is shown in FIG. 12, the odd-even field information identification module 22 may include an odd-even field information acquiring unit 220, and connected to the image processing chip 21. The odd-even field information acquiring unit 220 may be configured for: acquiring the first field feature array bitmap based on the first field image data, and acquiring the second field feature array bitmap based on the second field image data which is continuous with the first field image data; mosaicing the first frame feature array bitmap by using the first field feature array bitmap as the odd field feature array bitmap, meanwhile using the second field feature array bitmap as the even field feature array bitmap; mosaicing the second frame feature array bitmap by using the first field feature array bitmap as the even field feature array bitmap, meanwhile using the second field feature array bitmap as the odd field feature array bitmap; comparing the degree of fusion of the first field feature array bitmap and that of the second field feature array bitmap, and determining the odd-even field information of the processed field image data based on the comparison result. In this case, the second field image data may be a previous field image data provided continuously ahead of the first field image data; however, the second field image data may also be a subsequent field image data provided continuously behind the first field image data.

When acquiring the first field feature array bitmap and the second field feature array bitmap based on the first field image data and the second field image data, the odd-even field information acquiring unit 220 may be further configured for: respectively calculating the difference values of the pixels of every two adjacent columns of the first field image data and the second field image data, and thereby forming a first difference value array and a second difference value array correspondingly; comparing each of the difference values in the first difference value array and the second difference value array respectively with a preset threshold value. In this case, when the difference value at one point of the first difference value array or the second difference value array is greater than the preset threshold value, the value of the point may be set to 1 for indicating that the point is a contour point. However, when the difference value at one point of the first difference value array or the second difference value array is less than or equal to the preset threshold value, the value of the point may be set to 0. In this way, the first field feature array bitmap and the second field feature array bitmap may be formed. In this case, the value of the threshold value can be determined based on empirical values in actual debugging process, as long as contour lines in the image can be well distinguished.

After the first field feature array bitmap and the second field feature array bitmap are formed, the odd-even field information acquiring unit 220 may be further configured for: acquiring the quantities of the continuous contour points respectively in the first frame feature array bitmap and the second frame feature array bitmap; comparing the degree of fusion of the first frame feature array bitmap with that of the second frame feature array bitmap based on the quantities of the contour points in the first frame feature array bitmap and the second frame feature array bitmap. In this case, the more continuous contour points, the greater degree of fusion.

In specific, the odd-even field information acquiring unit 220 may be configured for: detecting one contour point respectively in the first frame feature array bitmap and the second frame feature array bitmap; respectively determining whether the value of a previous column or a subsequent column of the next row of the contour point is 1; when the value is 1, the contour points being continuous; otherwise, the contour points being discontinuous; and calculating the quantities of the continuous contour points respectively in the first frame feature array bitmap and the second frame feature array bitmap. When the degree of fusion of the first frame feature array bitmap is greater than that of the second frame feature array bitmap, the first frame feature array bitmap is mosaicked in the right way; in this case, the first field image data is the odd field image data, while the second field image data is the even field image data. On the contrary, when the degree of fusion of the first frame feature array bitmap is lower than that of the second frame feature array bitmap, the second frame feature array bitmap is mosaicked in the right way; in this case, the first field image data is the even field image data, while the second field image data is the odd field image data.

In a further embodiment of the present disclosure, the odd-even field information acquiring unit 220 may also be configured for detecting row and column positions of each of the contour points in the first frame feature array bitmap and the second frame feature array bitmap, and correspondingly forming a first array and a second array; then calculating the position difference values between every two adjacent elements in the first array and the second array, and in turn determining the odd-even field information of the processed field image data based on the variation of the position difference values. In specific, when a hopping is happened to the adjacent position difference values of the first array or the second array, the first frame feature array bitmap or the second frame feature array bitmap may be considered to be mosaicked in the wrong way. When the position difference values of the first array or the second array are changed linearly, such as the position differences increase or decrease successively, or keep constant, the first frame feature array bitmap or the second frame feature array bitmap may be considered to be mosaicked in the right way. When the first frame feature array bitmap is mosaicked in the right way, the first field image data is the odd field image data, while the second field image data is the even field image data. However, when the second frame feature array bitmap is mosaicked in the right way, the first field image data is the even field image data, while the second field image data is the odd field image data.

In a further embodiment of the present disclosure, when the deinterlace processing module 23 is performing the deinterlace processing of the processed field image data based on the corresponding odd-even field information, when the processed field image data is the odd field image data, the deinterlace processing module 23 may perform the deinterlace processing by using the processed field image data as the image data of the odd-numbered rows, meanwhile using the continuous previous image data or subsequent image data as the image data of the even-numbered rows, in order to acquire the frame image data. However, when the processed field image data is the even field image data, the deinterlace processing module 23 may perform the deinterlace processing by using the processed field image data as the image data of the even-numbered rows, meanwhile using the continuous previous image data or subsequent image data as the image data of the odd-numbered rows, in order to acquire the frame image data.

By using the methods described above, the odd-even field information can be identified from the image data in real time via the odd-even field information identification module 22, and the identification of the odd-even field information will not be affected even though some field are discarded. In this way, the deinterlace processing module 23 can perform the deinterlace processing based on reasonable and correct odd-even field information all the time, and the display effect of video image will not be affected even though some field are discarded. The apparatus of the present disclosure costs low.

In a further embodiment of the present disclosure, as is further shown in FIG. 12, the odd-even field information identification module 22 may include a field sequence decision making unit 221 connected to the deinterlace processing module 23. The field sequence decision making unit 221 may be configured for: storing a segment of video image and acquiring the field sequence of the odd field image data or the even field image data in the video image; comparing the field sequence of the odd field image data or the even field image data acquired from the video image with the field sequence used in the current deinterlace processing performed by the deinterlace processing module 23. When these two field sequences are the same, the field sequence in the deinterlace processing module may maintain unchanged. When these two field sequence are opposite to each other, the field sequence in the deinterlace processing module 23 may be changed to the acquired field sequence. When parts of the two field sequences are the same while the rests are opposite to each other, the field sequence in the deinterlace processing module may maintain unchanged.

In specific, when acquiring the odd field image data or the even field image data of the video image, the field sequence decision making unit 221 may be further configured for: dividing a plurality of continuous field image data into a plurality of groups by pairing two continuous field image data in time sequence; identifying the odd field image data and the even field image data of each group; and acquiring the field sequence of the odd field image data or even field image data based on the identification result.

In a further embodiment of the present disclosure, the image processing chip 21 in the apparatus 20 may be implemented as a CPU of a computer, a single chip microcomputer, a digital signal process, or the like. The odd-even field information identification module 22 may be implemented as a specified single chip microcomputer, a microprocessor, an identification circuit, or the like. The deinterlace processing module 23 may be implemented as a deinterleaver. Further, the video signal processing apparatus 20 may also be equipped with a storage for storing the image data in all processing stages.

In conclusion, in the present disclosure, the image processing of the video signal containing no odd-even field information is performed, and thus the processed field image data is acquired; the odd-even field information is identified and acquired based on the first filed image data and the second filed image data which are continuous with each other in time in the processed field image data; and the deinterlace processing of the processed field image data is performed based on the corresponding odd-even field information, in order to acquire the frame image data. Therefore, the present disclosure can identify the odd-even field information from the image data in real time, the display effect of video image will not be affected even though some field are discarded, and the apparatus of the present disclosure costs low.

The above description depicts merely some exemplary embodiments of the disclosure, but does not mean to limit the scope of the disclosure. Any equivalent structure or flow transformations made to the disclosure, or any direct or indirect applications of the disclosure on other related fields, shall all be covered within the protection of the disclosure.

What is claimed is:

1. A method for processing a video signal, comprising:
performing image processing of the video signal which contains no odd-even field information, and acquiring processed field image data;
identifying and acquiring corresponding odd-even field information based on first field image data and second field image data continuous in time among the processed field image data; and
performing deinterlace processing of the processed field image data based on the corresponding odd-even field information, thereby acquiring frame image data;
wherein the identifying and acquiring the corresponding odd-even field information based on the first field image data and the second field image data continuous in time among the processed field image data comprises:
acquiring a first field feature array bitmap based on the first field image data, and acquiring a second field feature array bitmap based on the second field image data;
using the first field feature array bitmap as an odd field feature array bitmap, and using the second field feature array bitmap as an even field feature array bitmap;
mosaicking the odd field feature array bitmap and the even field feature array bitmap together to form a first frame feature array bitmap;

using the first field feature array bitmap as the even field feature array bitmap, and using the second field feature array bitmap as the odd field feature array bitmap; mosaicking the odd field feature array bitmap and the even field feature array bitmap together to form a second frame feature array bitmap; and comparing a degree of fusion of the first frame feature array bitmap with that of the second frame feature array bitmap, and determining the odd-even field information of the processed field image data based on the comparison result.

2. The method according to claim 1, wherein the acquiring the first field feature array bitmap based on the first field image data, and acquiring the second field feature array bitmap based on the second field image data comprises:

calculating difference values of pixels of every two adjacent columns respectively of the first field image data and the second field image data, thereby forming a first difference value array and a second difference value array;

comparing each of the difference values in the first difference value array and the second difference value array with a preset threshold value; and when the difference value at one point being greater than the preset threshold value, setting a value of the point to 1 for indicating a contour point; when the difference value at one point being smaller than the preset threshold value, setting the value of the point to 0; thereby forming the first field feature array bitmap and the second field feature array bitmap.

3. The method according to claim 2, wherein the comparing the degree of fusion of the first frame feature array bitmap with that of the second frame feature array bitmap comprises:

acquiring quantities of continuous contour points respectively in the first frame feature array bitmap and the second frame feature array bitmap; and comparing the degree of fusion of the first frame feature array bitmap with that of the second frame feature array bitmap based on the quantities of the contour points respectively in the first frame feature array bitmap and the second frame feature array bitmap; wherein the more continuous contour points, the greater degree of fusion.

4. The method according to claim 3, wherein the acquiring the quantities of the continuous contour points respectively in the first frame feature array bitmap and the second frame feature array bitmap comprises:

detecting one contour point respectively in the first frame feature array bitmap and the second frame feature array bitmap;

determining whether a value of a previous column or a subsequent column in a next row of the contour point is 1 or not; when the value is 1, the contour points being continuous; otherwise, the contour points being discontinuous; and calculating the quantities of the continuous contour points respectively in the first frame feature array bitmap and the second frame feature array bitmap.

5. The method according to claim 1, wherein the comparing the degree of fusion of the first frame feature array bitmap with that of the second frame feature array bitmap, and determining the odd-even field information of the processed field image data based on the comparison result comprises:

when the degree of fusion of the first frame feature array bitmap being greater than that of the second frame feature array bitmap, the first frame feature array bitmap being mosaicked in the right way; using the first field image data as the odd field image data, and using the second field image data as the even field image data; and when the degree of fusion of the first frame feature array bitmap being smaller than that of the second frame feature array bitmap, the second frame feature array bitmap being mosaicked in the right way; using the first field image data as the even field image data, and using the second field image data as the odd field image data.

6. The method according to claim 1, wherein the comparing the degree of fusion of the first frame feature array bitmap with that of the second frame feature array bitmap, and determining the odd-even field information of the processed field image data based on the comparison result comprises:

detecting row and column positions of each of the contour points respectively in the first frame feature array bitmap and the second frame feature array bitmap, and correspondingly forming a first array and a second array; the contour point being the point in the frame feature array bitmap or the second frame feature array bitmap that has a value of 1;

calculating position difference values between every two adjacent elements respectively in the first array and the second array; and determining the odd-even field information of the processed field image data based on the variation of the position difference values.

7. The method according to claim 6, wherein the determining the odd-even field information of the processed field image data based on the variation of the position difference values comprises:

when a hopping being happened to the position difference values of the first array or the second array, the first frame feature array bitmap or the second frame feature array bitmap being mosaicked in a wrong way;

when the position difference values of the first array or the second array being changed linearly, the first frame feature array bitmap or the second frame feature array bitmap being mosaicked in a right way; and when the first frame feature array bitmap being mosaicked in the right way, using the first field image data as the odd field image data, and using the second field image data as the even field image data;

when the second frame feature array bitmap being mosaicked in the right way, using the first field image data as the even field image data, and using the second field image data as the odd field image data.

8. The method according to claim 1, further comprising:

storing a segment of video image, and acquiring field sequence of the odd field image data or the even field image data in the video image;

comparing the field sequence of the odd field image data or even field image data acquired from the video image with the field sequence in the current deinterlace processing;

when the two field sequences being the same, maintaining the field sequence in the current deinterlace processing unchanged;

when the two field sequences being opposite to each other, changing the field sequence in the current deinterlace processing to the acquired field sequence; and when parts of the two field sequences being the same while the rests being opposite to each other, maintaining the field sequence in the current deinterlace processing unchanged.

9. The method according to claim 8, wherein the acquiring the field sequence of the odd field image data or the even field image data in the video image comprises:
dividing a plurality of continuous field image data into a plurality of groups by pairing two continuous field image data in time sequence; identifying the odd field image data and the even field image data of each group; and
acquiring the field sequence of the odd field image data or the even field image data based on the identification result.

10. An apparatus for processing a video signal, comprising:
an image processing chip, configured for performing image processing of the video signal containing no field information, and acquiring processed field image data;
an odd-even field information identification module, connected to the image processing chip and configured for identifying and acquiring corresponding odd-even field information based on first field image data and second field image data which are continuous in time among the processed field image data; and
a deinterlace processing module, connected to the odd-even field information identification module and the image processing chip and configured for performing deinterlace processing of the processed field image data based on the corresponding odd-even field information in order to acquire frame image data;
wherein the odd-even field information identification module comprises an odd-even field information acquiring unit connected to the image processing chip and configured for:
acquiring a first field feature array bitmap based on the first field image data, and acquiring a second field feature array bitmap based on the second field image data;
mosaicing a first frame feature array bitmap by using the first field feature array bitmap as the odd field feature array bitmap, meanwhile using the second field array bitmap as the even field feature array bitmap;
mosaicing a second frame feature array bitmap by using the first field array bitmap as the even field feature array bitmap, meanwhile using the second field array bitmap as the odd field feature array bitmap; and
comparing the degree of fusion of the first field feature array bitmap and that of the second field feature array bitmap, and determining the odd-even field information of the processed field image data based on comparison result.

11. The apparatus according to claim 10, wherein the odd-even field information acquiring unit is further configured for:
respectively calculating the difference values of the pixels of every two adjacent columns of the first field image data and the second field image data, and thereby forming a first difference value array and a second difference value array correspondingly;
comparing each of the difference values in the first difference value array and the second difference value array respectively with a preset threshold value; and
when the difference value at one point being greater than the preset threshold value, setting a value of the point to 1 for indicating a contour point; when the difference value at one point being smaller than the preset threshold value, setting the value of the point to 0; thereby forming the first field feature array bitmap and the second field feature array bitmap.

12. The apparatus according to claim 11, wherein the odd-even field information acquiring unit is further configured for:
acquiring the quantities of the continuous contour points respectively in the first frame feature array bitmap and the second frame feature array bitmap; and
comparing the degree of fusion of the first frame feature array bitmap with that of the second frame feature array bitmap based on the quantities of the contour points in the first frame feature array bitmap and the second frame feature array bitmap; wherein the more continuous contour points, the greater degree of fusion.

13. The apparatus according to claim 12, wherein the odd-even field information acquiring unit is configured for:
detecting one contour point respectively in the first frame feature array bitmap and the second frame feature array bitmap;
respectively determining whether the value of a previous column or a subsequent column of the next row of the contour point is 1; when the value is 1, the contour points being continuous; otherwise, the contour points being discontinuous; and
calculating the quantities of the continuous contour points respectively in the first frame feature array bitmap and the second frame feature array bitmap.

14. The apparatus according to claim 10, wherein:
when the degree of fusion of the first frame feature array bitmap is greater than that of the second frame feature array bitmap, the first frame feature array bitmap is mosaicked in the right way; the first field image data is used as the odd field image data, and the second field image data is used as the even field image data; and
when the degree of fusion of the first frame feature array bitmap is smaller than that of the second frame feature array bitmap, the second frame feature array bitmap is mosaicked in the right way; the first field image data is used as the even field image data, and the second field image data is used as the odd field image data.

15. The apparatus according to claim 10, wherein the odd-even field information acquiring unit is further configured for:
detecting row and column positions of each of the contour points in the first frame feature array bitmap and the second frame feature array bitmap, and correspondingly forming a first array and a second array; the contour point being the point in the first frame feature array bitmap or the second frame feature array bitmap that has a value of 1;
calculating the position difference values between every two adjacent elements in the first array and the second array; and
determining the odd-even field information of the processed field image data based on the variation of the position difference values.

16. The apparatus according to claim 15, wherein the odd-even field information acquiring unit is further configured for:
when a hopping being happened to the position difference values of the first array or the second array, the first frame feature array bitmap or the second frame feature array bitmap being mosaicked in a wrong way;
when the position difference values of the first array or the second array being changed linearly, the first frame feature array bitmap or the second frame feature array bitmap being mosaicked in a right way; and when the first frame feature array bitmap being mosaicked in the right way, using the first field image data as the odd field image data, and using the second field image data as the even field image data;

when the second frame feature array bitmap being mosaicked in the right way, using the first field image data as the even field image data, and using the second field image data as the odd field image data.

17. The apparatus according to claim 10, wherein the odd-even field information identification module further includes a field sequence decision making unit connected to the deinterlace processing module, and configured for:

storing a segment of video image and acquiring the field sequence of the odd field image data or the even field image data in the video image;

comparing the field sequence of the odd field image data or the even field image data acquired from the video image with the field sequence used in the current deinterlace processing performed by the deinterlace processing module;

when the two field sequences being the same, maintaining the field sequence in the deinterlace processing module unchanged;

when the two field sequences being opposite to each other, changing the field sequence in the deinterlace processing module to the acquired field sequence; and when parts of the two field sequences being the same while the rests being opposite to each other, maintaining the field sequence in the deinterlace processing module unchanged.

18. The apparatus according to claim 17, wherein the field sequence decision making unit is further configured for:

dividing a plurality of continuous field image data into a plurality of groups by pairing two continuous field image data in time sequence; identifying the odd field image data and the even field image data of each group; and acquiring the field sequence of the odd field image data or even field image data based on the identification result.

* * * * *